US010793715B2

(12) United States Patent
Eggenhuisen et al.

(10) Patent No.: US 10,793,715 B2
(45) Date of Patent: Oct. 6, 2020

(54) ABUSIVELY MOLDED ARTICLE INCLUDING COLOR STABLE COMPONENTS

(71) Applicant: SABIC Global Technologies B.V., Bergen op Zoom (NL)

(72) Inventors: Tamara Marijke Eggenhuisen, Breda (NL); Roland Sebastian Assink, Middelburg (NL); Eduardus Ludovicus Louisa Broekaart, Nieuw-Namen (NL); Robert Dirk Van De Grampel, Tholen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 29 days.

(21) Appl. No.: 16/061,504

(22) PCT Filed: Dec. 12, 2016

(86) PCT No.: PCT/IB2016/057551
§ 371 (c)(1),
(2) Date: Jun. 12, 2018

(87) PCT Pub. No.: WO2017/103767
PCT Pub. Date: Jun. 22, 2017

(65) Prior Publication Data
US 2019/0284390 A1    Sep. 19, 2019

Related U.S. Application Data

(60) Provisional application No. 62/269,305, filed on Dec. 18, 2015.

(51) Int. Cl.
| | | |
|---|---|---|
| *C08L 69/00* | (2006.01) | |
| *B29B 7/88* | (2006.01) | |
| *B29C 45/00* | (2006.01) | |
| *C08K 5/00* | (2006.01) | |
| *C08K 5/08* | (2006.01) | |
| *B29K 69/00* | (2006.01) | |
| *B29K 105/00* | (2006.01) | |

(52) U.S. Cl.
CPC ............ *C08L 69/00* (2013.01); *B29B 7/88* (2013.01); *B29C 45/0001* (2013.01); *C08K 5/005* (2013.01); *C08K 5/0041* (2013.01); *C08K 5/08* (2013.01); *B29K 2069/00* (2013.01); *B29K 2105/0032* (2013.01); *B29K 2995/0018* (2013.01); *C08L 2201/08* (2013.01); *C08L 2205/025* (2013.01)

(58) Field of Classification Search
CPC ............ C08L 69/00; C08L 2201/08; C08L 2205/025; B29B 7/88; B29C 45/0001; B29K 2069/00; B29K 2105/0032; B29K 2995/0018
See application file for complete search history.

(56) References Cited

U.S. PATENT DOCUMENTS

| 5,608,027 A * | 3/1997 | Crosby | C08K 3/32 252/400.2 |
|---|---|---|---|
| 6,399,739 B1 * | 6/2002 | McCloskey | C08G 64/307 528/196 |
| 7,786,246 B2 | 8/2010 | Jansen et al. | |
| 2005/0250930 A1 | 11/2005 | Ikeda et al. | |
| 2007/0225415 A1 | 9/2007 | Bar-Yaakov et al. | |
| 2009/0054586 A1 | 2/2009 | Hein et al. | |
| 2011/0071241 A1 | 3/2011 | Rogunova et al. | |
| 2012/0157587 A1 | 6/2012 | Meyer et al. | |
| 2012/0172497 A1 | 7/2012 | Chi et al. | |
| 2013/0225763 A1 | 8/2013 | Pai-Paranjape et al. | |
| 2013/0270591 A1 * | 10/2013 | de Brouwer | H01L 23/293 257/98 |
| 2014/0094545 A1 | 4/2014 | Roncaglia et al. | |
| 2014/0178665 A1 | 6/2014 | Morizur et al. | |
| 2014/0242364 A1 | 8/2014 | Meyer et al. | |
| 2019/0284365 A1 | 9/2019 | Eggenhuisen et al. | |
| 2019/0382557 A1 | 12/2019 | Eggenhuisen et al. | |

FOREIGN PATENT DOCUMENTS

| CN | 1189512 A | 8/1998 |
|---|---|---|
| CN | 101835835 A | 9/2010 |
| CN | 102459459 A | 5/2012 |
| CN | 103429651 A | 12/2013 |
| CN | 104136489 A | 11/2014 |
| CN | 104837924 A | 8/2015 |
| EP | 0683200 A1 | 11/1995 |
| EP | 0855602 A2 | 7/1998 |
| EP | 1566396 A1 | 8/2005 |
| EP | 2677002 A1 | 12/2013 |
| EP | 2730618 A1 | 5/2014 |
| KR | 20120078546 A | 7/2012 |

OTHER PUBLICATIONS

PubChem, 1,4-Bis((2,6-diethyl-4-methylphenyl)amino)anthraquinone Compound Summary, p. 1-11, 2019.*
Cytec, Cyasorb® UV-5411 data sheet, p. 1, retrieved Sep. 30, 2019.*
Chemical Book, Solvent Green 28 and Solvent Red 52 data sheets, retrieved May 6, 2020 [url: https://www.chemicalbook.com/ProductChemicalPropertiescb6751658_EN.htm;https://www.chemicalbook.com/ProductChemicalPropertiesCB7325229_EN.htm].*

(Continued)

*Primary Examiner* — Robert S Jones, Jr.
(74) *Attorney, Agent, or Firm* — Cantor Colburn LLP

(57) ABSTRACT

A molded article includes a polycarbonate resin and a colorant, and the molded article, when tested using a 3 mm color plaque, includes a color difference delta E (dE*) of less than about 0.6 following molding under abusive molding conditions as compared to a reference article molded under standard processing conditions. The molded article may include a color difference delta b (db*) of less than about 0.3 after being molded under the abusive molding conditions. The molded article may also exhibit a shift in wavelength of maximum absorbance of less than about 5 nm after being molded under the abusive molding conditions and/or a difference in absorbance intensity of less than about 15% after being molded under the abusive molding conditions as compared to a reference article molded under standard processing conditions. Methods for forming a molded article in accordance with the above are also described.

20 Claims, No Drawings

(56) References Cited

OTHER PUBLICATIONS

Ashford's Dictionary of Industrial Chemicals, entry for Disperse Orange 47, retrieved May 6, 2020 [url: http://www.industrialchemistry.org/PDF/r17274.pdf].*
International Patent Application No. PCT/IB2016/057550; Int'l Search Report and the Written Opinion; dated Feb. 27, 2017; 10 pages.
International Patent Application No. PCT/IB2016/057550; Int'l Preliminary Report on Patentability; dated Jun. 28, 2018; 7 pages.
International Patent Application No. PCT/IB2016/057551; Int'l Search Report and the Written Opinion; dated Feb. 27, 2017; 11 pages.
International Patent Application No. PCT/IB2016/057551; Int'l Preliminary Report on Patentability; dated Jun. 28, 2018; 8 pages.
BASF; "Tinuvin 360 Very Low Volatile Benzotriazole UV Absorber Technical Information"; Aug. 2010; pp. 1-3.

* cited by examiner

ABUSIVELY MOLDED ARTICLE INCLUDING COLOR STABLE COMPONENTS

CROSS-REFERENCE TO RELATED APPLICATION

This application is the National Stage of International Application No. PCT/IB 2016/057551, filed Dec. 12, 2016, which claims the benefit of U.S. Provisional Application No. 62/269,305 filed Dec. 18, 2015, the disclosures of which are incorporated herein by this reference in their entireties.

FIELD OF THE DISCLOSURE

The present disclosure relates to molded articles, and in particular molded articles including color stable components that retain desirable physical properties after processing under high heat conditions.

BACKGROUND OF THE DISCLOSURE

Polycarbonates (PC) are used in a wide variety of applications because of their good balance of properties, including moldability, impact and transparency. For outdoor applications a UV stabilizer is typically added to improve the weatherability of polycarbonate under exposure to light containing UV radiation. By absorbing UV radiation and dissipating the energy via unreactive pathways, a UV absorbing component minimizes yellowing and stabilizes the polycarbonate. Colorants that absorb in the 500 to 700 nanometer (nm) wavelength region are added to compensate for the yellow appearance that is generated by addition of UV absorbing component.

Typical molding conditions for molded polycarbonate articles such as those used in automotive lighting lens (e.g., headlamp) and other applications utilize maximum temperatures of from about 280-310 degrees Celsius (° C.). Polycarbonate resin, which is a desirable material for such applications because of its high transparency and good impact properties, can be molded into many useful articles at these temperatures. Increasing demands for more highly shaped and lighter weight articles (i.e., articles having a reduced wall thickness), however, result in a need to increase the temperature of the polycarbonate resin during molding so that it has sufficient flow (low enough viscosity) to fill the entire mold. In addition, it may be desirable to increase the amount of time that the polycarbonate resin is held at these elevated temperatures to ensure that the polycarbonate is set in the mold. This may be particularly desirable in multicomponent (e.g., 2-component or 2K) molding applications. These applications may thus require increased molding temperatures from standard temperatures of about 280-310° C. to about 330-360° C., and increased residence times at these temperatures, which are well above the decomposition temperature of polycarbonate. If the polycarbonate, UV absorbing component or colorants decompose under these molding conditions, the article will yellow and its mechanical performance, chemical resistance and weatherability could degrade.

These and other shortcomings are addressed by aspects of the present disclosure.

SUMMARY

Aspects of the present disclosure relate to a molded article including: a polycarbonate resin; an ultraviolet (UV) absorbing component; a heat stabilizer component; and a colorant. The molded article, when tested using a 2.5 millimeter (mm) color plaque, includes a color difference delta E* (dE*) of less than about 0.6 following molding under abusive molding conditions as compared to a reference article molded under standard processing conditions.

In other aspects a method for forming a molded article includes: combining a polycarbonate resin, a UV absorbing component, a heat stabilizer component and a colorant to form a mixture; and forming a molded article from the mixture by molding the mixture under abusive molding conditions. The molded article, when tested using a 2.5 mm color plaque, includes a dE* of less than about 0.6 following molding under abusive molding conditions as compared to a reference article molded under standard processing conditions.

Aspects of the present disclosure further relate to a molded article including a polycarbonate resin and a colorant. The molded article, when tested using a 3 mm color plaque, includes a dE* of less than about 0.6 following molding under abusive molding conditions as compared to a reference article molded under standard processing conditions.

In further aspects a method for forming a molded article includes combining a polycarbonate resin and a colorant to form a mixture, and forming a molded article from the mixture by molding the mixture under abusive molding conditions. The molded article, when tested using a 3 mm color plaque, includes a dE* of less than about 0.6 following molding under abusive molding conditions as compared to a reference article molded under standard processing conditions.

DETAILED DESCRIPTION

The present disclosure can be understood more readily by reference to the following detailed description of the disclosure and the Examples included therein.

Elevated temperatures and increased molding residence times may result in decomposition of polycarbonate resin and/or other additives, which may result in the occurrence of undesirable properties within the molded article, including but not limited to color change (e.g., yellowing), reduction in mechanical properties (e.g., impact strength), loss of chemical resistance, and reduced weatherability. Even processing under standard temperatures (e.g., 280° C. to 290° C.) may impart undesirable properties to the molded article. To minimize these undesirable effects, the polycarbonate resin may include additives such as a heat stabilizer and a UV absorbing component. The additives should be stable under the selected processing conditions in order to avoid yellowing of the polycarbonate resin composition from decomposition of the components. A greater change in color difference delta E (dE*) of the molded article indicates such a decomposition of the polycarbonate resin composition and its respective properties. In various aspects, the present disclosure pertains to molded articles including a polycarbonate resin, an ultraviolet (UV) absorbing component, a heat stabilizer component, and a colorant. The molded article, when tested using a 2.5 mm color plaque, includes a dE* of less than about 0.6 following molding under abusive molding conditions as compared to a reference article molded under standard processing conditions. Further aspects pertain to molded articles including a polycarbonate resin and a colorant. The molded article, when tested using a 3 mm color plaque, includes a dE* of less than about 0.6 following molding under abusive molding conditions as compared to a reference article molded under standard processing conditions.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additive materials" means that the additional additive materials can or cannot be substituted and that the description includes molded articles that both include and do not include additional additive materials.

As used herein, the term "effective amount" refers to an amount that is sufficient to achieve the desired modification of a physical property of the composition or material. For example, an "effective amount" of a heat stabilizer component refers to an amount that is sufficient to achieve the desired improvement in the property modulated by the formulation component, e.g. achieving the desired level of UV absorbing component stability and/or color stability. The specific level in terms of wt % in a composition required as an effective amount will depend upon a variety of factors including the amount and type of polycarbonate, amount and type of other components, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

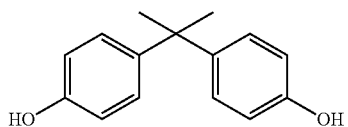 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Certain abbreviations are defined as follows: "g" is grams, "kg" is kilograms, "° C." is degrees Celsius, "min" is minutes, "mm" is millimeter, "mPa" is megapascal, "WiFi" is a system of accessing the internet from remote machines, "GPS" is Global Positioning System—a global system of U.S. navigational satellites which provide positional and velocity data. "LED" is light-emitting diode, "RF" is radio frequency, and "RFID" is radio frequency identification.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Abusively Molded Article Including Color Stable Components

Aspects of the present disclosure relate to a molded article including a polycarbonate resin, a UV absorbing component, a heat stabilizer component, and a colorant. The molded article, when tested using a 2.5 mm color plaque, includes a dE* of less than about 0.6 following molding under abusive molding conditions as compared to a reference article molded under standard processing conditions. Further aspects relate to molded articles including a polycarbonate resin and a colorant. The molded article, when tested using a 3 mm color plaque, includes a dE* of less than about 0.6 following molding under abusive molding conditions as compared to a reference article molded under standard processing conditions.

It has been found that color stability in an abusively molded article including a polycarbonate resin may be maintained by including a UV absorbing component. The UV absorbing component absorbs the UV radiation and dissipates its energy via unreactive pathways, which stabilizes the polycarbonate and prevents yellowing of the molded article. This yellowing may be apparent in a transparent polycarbonate resin. Accordingly, a measured change in yellowing of the polycarbonate composition may be indicative of decomposition or degradation of the polycarbonate composition and/or additives included therein. The yellowing of the polycarbonate composition may be determined by measuring the change in the Yellowness Index (ΔYI) of the polycarbonate composition in accordance with ASTM D1925 (1988) (Test Method for Yellowness Index of Plastics (Withdrawn 1995)).

In various aspects of the present disclosure, abusive molding conditions relate to the maximum temperature at which the article is molded and the amount of time the article is held at that maximum temperature. As noted above, while typical molding conditions for molded polycarbonate articles such as those used in automotive lighting (e.g., headlamp) and other applications utilize maximum temperatures of from about 280-310 degrees Celsius (° C.), in some applications it is desirable to increase the molding temperatures to at least about 330° C., up to at least about 360° C. In addition, it may be desirable to increase the amount of time that the polycarbonate resin is held at these elevated temperatures: while in standard molding applications residence times may be about 6 minutes or less, they may need to be increased to up to about 12 minutes or longer in certain applications. Such abusive molding conditions may result in attachment of the UV absorbing component to the polycarbonate chain. As the UV absorbing component attaches to the polycarbonate chain, the level of free UV absorbing component is reduced, which may ultimately result in the molded article having undesirable properties. Aspects of the disclosure, which relate to polycarbonate resin-based molded articles including a UV absorbing component, demonstrate the effect on color stability of the polycarbonate resin. As an example, the molded article may exhibit a ΔYI of less than about 2.0 after abusive molding at a maximum molding temperature of at least about 350° C. for a time of about 15 minutes as compared to an article molded at a temperature of 300° C.

In certain aspects, the abusive molding conditions include molding the article at a maximum temperature of at least about 330° C. at a residence time of at least about 10 minutes, or at a maximum temperature of at least about 330° C. at a residence time of at least about 12 minutes, or at a maximum temperature of at least about 330° C. at a residence time of at least about 15 minutes, or at a maximum temperature of at least about 340° C. at a residence time of at least about 6 minutes, or at a maximum temperature of at least about 340° C. at a residence time of at least about 10 minutes, or at a maximum temperature of at least about 350° C. at a residence time of at least about 6 minutes, or at a maximum temperature of at least about 350° C. at a residence time of at least about 10 minutes, or at a maximum temperature of at least about 350° C. at a residence time of at least about 15 minutes, or even at a maximum temperature of at least about 360° C. at a residence time of at least about 3 minutes.

In a more particular aspect the abusive molding conditions include molding the article at a maximum temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes. In a certain aspect the abusive molding conditions include molding the article at a maximum temperature of at least about 350° C. at a residence time of at least about 15 minutes.

In some aspects of the disclosure, the polycarbonate resin has an endcap level of at least about 95%. Polycarbonate resins having this endcap level may generally be produced by an interfacial polymerization process. Purely by way of example, in one particular interfacial polymerization process in which the polycarbonate is BPA polycarbonate, the BPA polycarbonate is produced by amine catalyzed interfacial polycondensation of bisphenol A and phosgene. In contrast to other known methods for forming polycarbonates (such as melt transesterification processes) in which the polycarbonate has an endcap level of less than about 95%, polycarbonates formed by an interfacial polymerization process are characterized as having an endcap level of at least about 95%. In some aspects, the polycarbonate resin has an endcap level of at least about 98%, or even an endcap level of at least about 99%. In further aspects, the polycarbonate resin is substantially fully endcapped.

Suitable polycarbonates for use in molded articles according to the present disclosure include but are not limited to bisphenol A, a polycarbonate copolymer, polyester carbonate polymer, or polycarbonate-polysiloxane copolymer, or combinations thereof.

In one aspect, a polycarbonate can include any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions having repeating structural units of the formula (1):

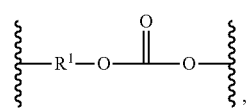

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[12.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In addition to the polycarbonates described above, combinations of the polycarbonate with other thermoplastic polymers, for example combinations of homopolycarbonates and/or polycarbonate copolymers, can be used.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like.

In a further aspect, the polycarbonate resin includes a polyester-polycarbonate copolymer, and specifically a polyester-polycarbonate copolymer including ester units that comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect, the $C_{6-20}$ aliphatic dicarboxylic acid ester unit includes a straight chain alkylene group comprising methylene (—CH$_2$—) repeating units.

All types of polycarbonate end groups are contemplated as being useful in the polycarbonate composition, provided that such end groups do not significantly adversely affect desired properties of the compositions.

In a further aspect, the polycarbonate polymer is a homopolymer. In a still further aspect, the homopolymer comprises repeating units derived from bisphenol A.

In a still further aspect, the polycarbonate component is a copolymer. In a still further aspect, the copolymer comprises repeating units derived from BPA. In yet a further aspect, the copolymer comprises repeating units derived from sebacic acid. In an even further aspect, the copolymer comprises repeating units derived from sebacic acid and BPA. Useful polycarbonate copolymers are commercially available and include, but are not limited to, those marketed under the trade names LEXAN® EXL and LEXAN® HFD polymers, and are available from SABIC Innovative Plastics (formerly GE Plastics).

In some aspects of the disclosure, the polycarbonate resin is a high purity polycarbonate resin. High purity polycarbonate resins are generally characterized as having a purity of at least about 99.70% and which contains less than 2 parts per million (ppm) sulfur, although other purity criteria could be applied. In certain aspects the polycarbonate resin included in molded articles of the disclosure is produced from a bisphenol A polymer having a purity of at least about 99.70% and which contains less than 2 ppm sulfur.

In a further aspect of the present disclosure, the molded article may be transparent. As used herein, transparent, transparency, and their derivatives may refer to a level of transmission for a resin composition that is greater than 89%, including exemplary transmission values of at least 90%, at least 91%, at least 92%, at least 93%, at least 94%, at least 95%, or any range of transmission values derived from the above exemplified values. In a particular aspect, the molded article has a transmission of from about 89% to about 93%. The transmission may be calculated according to ASTM method D1003-13 (Standard Test Method for Haze and Luminous Transmittance of Transparent Plastics), Procedure A, from data collected on, e.g. a Haze-Guard dual (BYK Gardner) using a standard lamp D65.

Molded articles according to aspects of the present disclosure may have one or more particular colorimetric values (dE*, L*, a*, and/or b*). For example, in some aspects, an article molded under abusive molding conditions described herein may, when tested using a 2.5 mm color plaque, have a dE* of less than about 0.6, or less than about 0.5, or less than about 0.4, or less than about 0.3, or less than about 0.2, or less than about 0.1, or any range of dE* derived from the above-exemplified values. In certain aspects the testing could be performed using a color plaque of a different size, e.g., a 3 mm color plaque. The change is in comparison to a reference article molded at a maximum temperature of 300° C. and for a residence time of 6 minutes (i.e., standard molding conditions). As used herein, "reference article," refers to an article including the same components (polycarbonate, UV absorbing component, and other additives) and same amounts of those components. Colorimetric values (dE*, L*, a*, b*) may be calculated according to ASTM E308-15 (Standard Practice for Computing the Colors of Objects by Using the CIE System) using spectral transmission data for D65 illumination and 10° observer. Transmission spectra may be collected on an X rite i7 spectrophotometer. Color difference is calculated according to the CIE 1976 color difference equation:

$$dE^* = \sqrt{dL^{*2} + da^{*2} + db^{*2}}$$

In further aspects, an article molded under abusive molding conditions described herein may, when tested using a 2.5 mm color plaque, have a color difference delta b* (db*) of less than about 0.3, or less than about 0.2, or less than about 0.1, or less than about 0.05, or any range of db* derived from the above-exemplified values. The change is in comparison to a reference article molded at a maximum temperature of 300° C. and for a residence time of 6 minutes (i.e., standard molding conditions). db* may be calculated according to ASTM E308-15 as described above.

Aspects of the disclosure relate to molded articles that include a UV absorbing component. In certain aspects, the UV absorbing component is a benzotriazole compound, a triazine compound, or a combination thereof. Examples of suitable UV absorbing components include, but are not limited to 2-(2'-Hydroxy-5'-t-octylphenyl) benzotriazole (e.g., CYASORB® UV5411, available from Cytec Industries) (UV5411), 2-(2 hydroxy-3,5 dicumyl) benzotriazole (e.g., Tinuvin® 234, available from BASF) (UVA 234), phenol, 2,2'-methylenebis(6-(2H-benzotriazol-2-yl)-4-(1,1,3,3-tetramethylbutyl)- (e.g., Tinuvin® 360, available from BASF) (LA31RG/T360), phenol, 2-(4,6-diphenyl-1,3,5-triazin-2-yl)-5-(hexyloxy)- (e.g., Tinuvin® 1577, available from BASF) (T1577), 1,3-Bis((2-cyano-3,3-diphenylacryloyl)oxy)-2,2-bis(((2-cyano-3,3-diphenylacryloyl)oxy)methyl)propane (e.g., Uvinul® 3030, available from BASF) (UV3030), 2,2'-(1,4-phenylene)bis-4h-3,1-benzoxazin-4-one (e.g., CYASORB® UV-3638, available from Cytec Industries) (UV-3638), and combinations thereof. In one particular aspect, the UV absorbing component is phenol, 2,2'-methylenebis(6-(2H-benzotriazol-2-yl)-4-(1,1,3,3-tetramethylbutyl)- (LA31RG/T360).

Any effective amount of UV absorbing component can be included in the molded article. In some aspects the UV absorbing component is present in the molded article in an amount of from about 0.01 to about 1.0 weight percent (wt %) of the composition, or in certain aspects in an amount of from about 0.01 to about 0.50 wt % of the composition, or even in an amount of from about 0.05 to about 0.30 wt % of the composition.

According to aspects of the present disclosure, the molded article may be of a particular dimension in order to exhibit the color stability as disclosed herein. As an example, the molded article may be of a particular thickness. In one example, the molded article may have a maximum thickness of about 3 mm, or in certain aspects has a thickness of about 1.5 to 2.0 mm. In further examples, the molded article may have a maximum length or width dimension of from about 30 centimeters (cm) to about 100 cm.

In further aspects, the molded article may include a polycarbonate resin and a colorant. The colorant may be added to impart a particular color to the resultant molded article. The colorant can be any suitable colorant, including a pigment, a dye, and/or a combination thereof. The colorant can be an organic colorant, an inorganic colorant, and/or combinations thereof. The colorant can include titanium dioxide, carbon black, and/or combinations thereof. According to aspects of the present disclosure, the molded article including the colorant may exhibit color stability after abusive molding conditions as described herein. That is, the molded article may include a ΔYI of less than about 2.0 after being molded under abusive molding conditions, or a ΔYI of less than about 1.0 after being molded under abusive molding conditions. The ΔYI is compared to a molded article having the same components, and amounts of components, that has been subjected to standard molding conditions (e.g., a maximum molding temperature of 300° C. and time of 6 minutes).

In further aspects, exemplary colorants of the present disclosure may exhibit no appreciable change in the observed transmission spectra of the polycarbonate resin composition after being subjected to abusive molding conditions. Transmission spectra may be measured on, e.g., an X-Rite i7 spectrophotometer for standard and abusive molding conditions using a color plaque, such as a 2.5 mm or 3.0 mm color plaque. Absorbance may then be calculated from the transmission spectra using the Beer-Lambert law:

$$A_\lambda = \log 10(I_0/I) = a\lambda \cdot b \cdot c$$

where A is the calculated absorbance, $I_0$ is the incident light intensity, I is the measured light intensity, $a\lambda$ is a wavelength-dependent absorptivity coefficient, b is the path length, and c is the concentration of the analyte. For a given colorant, the absorption spectrum may have a pronounced maximum value at a specific wavelength related to the molecular structure of the colorant. Should a shift in maximum absorption be observed (shift ($\Delta\lambda$)) or should the absorptivity become less ($\Delta I$), it indicates a change in the molecular structure, which may indicate molecular degradation.

In some aspects molded articles including colorants of the present disclosure exhibit a difference in absorbance intensity (i.e., a change in absorbance ($\Delta I$)) of less than about 15% following abusive molding. In certain aspects molded articles including colorants of the present disclosure exhibit a difference in absorbance intensity of less than about 10% following abusive molding, or exhibit no appreciable difference in absorbance intensity. The difference in absorbance intensity is compared to a molded article having the same components, and amounts of components, that has been subjected to standard molding conditions (e.g. a maximum molding temperature of 300° C. and time of 6 minutes).

In further aspects molded articles including colorants of the present disclosure exhibit a shift in wavelength of maximum absorbance (shift ($\Delta\lambda$)) of less than about 5 nm following abusive molding. In yet further aspects molded articles including colorants of the present disclosure exhibit no appreciable shift in wavelength of maximum absorbance following abusive molding. The shift in wavelength of maximum absorbance is compared to a molded article having the same components, and amounts of components, that has been subjected to standard molding conditions (e.g. a maximum molding temperature of 300° C. and time of 6 minutes).

In some aspects molded articles including colorants of the present disclosure exhibit a difference in absorbance intensity of less than about 15% and a shift in wavelength of maximum absorbance of less than about 5 nm following abusive molding.

Molded articles according to aspects of the disclosure may also exhibit a wavelength of maximum absorbance of greater than about 550 nm after being molded under abusive molding conditions. In further aspects the molded article exhibits a wavelength of maximum absorbance after abusive molding of greater than about 570 nm, or greater than about 590 nm, or greater than 600 nm.

Exemplary colorants may include, but are not limited to, Solvent Violet 13 (SV13), Solvent Violet 36 (SV 36), Solvent Blue 97 (S BL 97), Solvent Blue 104 (S BL 104), Pigment Blue 15:1 (P BL 15:1), Pigment Blue 60 (P BL 60), Red violet 26/31 (DV 26/31), and the like, as well as combinations including one or more of the foregoing. Any effective amount of the colorant may be included in the molded article. In some aspects the colorant is present in the molded article in an amount of from about 0.00001 to about 0.01 weight percent of the composition, or in certain aspects in an amount of from about 0.00002 to about 0.0010 wt % of the composition, or even in an amount of from about 0.00002 to about 0.0005 wt % of the composition.

In some aspects of the present disclosure, the molded article may include a heat stabilizer component. The heat stabilizer component may stabilize the polycarbonate resin in the molded article by improving color stability upon heat processing. In some aspects the heat stabilizer component includes at least one organophosphorous compound, including but not limited to a phosphite, phosphine or phosphonite compound. In particular aspects, the heat stabilizer component includes tris-(2,4-di-tert-butylphenyl) phosphite (e.g., IRGAFOS® 168, available from BASF) (IRG), triphenylphosphine (TPP), tridecylphosphite (TDP), tetrakis(2,4-di-tert-butylphenyl)-4,4-diphenyldiphosphonite) (PEPQ), bis (2,4-dicumylphenyl) pentaerythritol diphosphite (e.g., Doverphos S-9228, available from Dover Chemical) (DP), diphenyl monodecyl phosphite (DPDP), or combinations thereof. In specific aspects the heat stabilizer component includes IRG.

Any effective amount of heat stabilizer component can be included in the molded article. In some aspects the heat stabilizer component is present in the molded article in an amount of from about 0.01 wt % to about 0.5 wt % of the composition, or in certain aspects in an amount of from about 0.01 wt % to about 0.2 wt % of the composition, or even in an amount of from about 0.01 wt % to about 0.1 wt % of the composition.

In addition to the foregoing components, the disclosed molded articles can optionally include an effective amount of one or more additional additive materials ordinarily incorporated in polycarbonate resin compositions of this type, with the proviso that the additives are selected so as to not significantly adversely affect the desired properties of the polycarbonate resin composition. Combinations of additives can be used. Such additives can be combined with the other components at a suitable time during the mixing of the components prior to or during molding Exemplary and non-limiting examples of additive materials that can be present in the disclosed molded article include additional reinforcing fillers, an acid scavenger, anti-drip agent, antioxidant, antistatic agent, chain extender, colorant (e.g., pigment and/or dye), de-molding agent, flow promoter, lubricant, mold release agent, plasticizer, quenching agent, flame retardant stabilizer (including for example a thermal stabilizer, a hydrolytic stabilizer, or a light stabilizer), UV reflecting additive, or any combination thereof. In particular aspects, the molded article includes additional additive materials, including a phenolic heat stabilizer component (e.g., Irganox® 1076, available from BASF), a carboxylic acid ester (e.g., PETS), or a combination thereof.

In certain aspects, each of the additives in the molded article, including but not limited to the UV absorbing component, the heat stabilizer component have maximum impurities of no more than 20 ppm sodium, no more than 10 ppm magnesium, no more than 20 ppm calcium, no more than 0.5 ppm zinc and no more than 0.5 ppm tin. In some aspects each of the additives include no more than 10 ppm sodium, or no more than 2 ppm sodium, or no more than 2 ppm magnesium, or no more than 10 ppm calcium.

Molded articles formed under abusive molding conditions according to aspects described herein may exhibit several improved properties over previously known molded articles. Properties of such molded articles include, but are not limited to, improved yellowing index ($\Delta$YI) following abusive molding.

In some aspects the molded article, when calculated in accordance with ASTM D1925 (1988), has a $\Delta$YI of less than about 1.10 after abusive molding, or a $\Delta$YI of less than about 1.0 after abusive molding, or a $\Delta$YI of less than about 0.90 after abusive molding, or a $\Delta$YI of less than about 0.75 after abusive molding, or a $\Delta$YI of less than about 0.60 after abusive molding, or a ΔYI of less than about 0.50 after abusive molding, or a ΔYI of less than about 0.35 after abusive molding, or even a ΔYI of less than about 0.20 after abusive molding. The ΔYI is compared to a molded article having the same components, and the same amounts of components, that has not been subjected to abusive molding conditions.

Methods for Forming Abusively Molded Article Including Color Stable Components

The present disclosure also relates to methods for forming UV stable and color stable polycarbonate derived molded articles. In one aspect, a method for forming a molded article includes: combining a polycarbonate resin, a UV absorbing component, a heat stabilizer component and a colorant to form a mixture; and forming a molded article from the mixture by molding the mixture under abusive molding conditions. The molded article, when tested using a 2.5 mm color plaque, includes a dE* of less than about 0.6 following molding under abusive molding conditions as compared to a reference article molded under standard processing conditions (e.g., a maximum molding temperature of 300° C. at a residence time of 6 minutes).

Further aspects of the present disclosure relate to a method for forming a molded article that includes combining a polycarbonate resin and a colorant to form a mixture, and forming a molded article from the mixture by molding the mixture under abusive molding conditions. The molded article, when tested using a 3 mm color plaque, includes a dE* of less than about 0.6 following molding under abusive molding conditions as compared to a reference article molded under standard processing conditions (e.g., a maximum molding temperature of 300° C. at a residence time of 6 minutes).

In certain aspects, the abusive molding conditions include molding the article at a maximum temperature of at least about 330° C. at a residence time of at least about 10 minutes, or at a maximum temperature of at least about 330° C. at a residence time of at least about 12 minutes, or at a maximum temperature of at least about 330° C. at a residence time of at least about 15 minutes, or at a maximum temperature of at least about 340° C. at a residence time of at least about 6 minutes, or at a maximum temperature of at least about 340° C. at a residence time of at least about 10 minutes, or at a maximum temperature of at least about 350° C. at a residence time of at least about 6 minutes, or at a maximum temperature of at least about 350° C. at a residence time of at least about 10 minutes, or at a maximum temperature of at least about 350° C. at a residence time of at least about 15 minutes, or even at a maximum temperature of at least about 360° C. at a residence time of at least about 3 minutes.

In a more particular aspect the abusive molding conditions include molding the article at a maximum temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes. In a certain aspect the abusive molding conditions include molding the article at a maximum temperature of at least about 350° C. at a residence time of at least about 15 minutes.

Other aspects of the method include selection of a polycarbonate resin, UV absorbing component, colorant, heat stabilizer component and optional additional additive components such as those described above. Molded articles formed according to the above methods may have one or more of the physical characteristics described above, including but not limited to those relating to transparency, colorimetric values (e.g., dE* and db*), transmission spectra, difference in absorbance intensity, shift in wavelength of maximum absorbance, wavelength of maximum absorbance, and yellowing index.

Molded articles according to aspects of the disclosure described herein may be applicable for use in a wide variety of applications, particular those requiring color stability combined with abusive molding conditions. Further, the molded articles may be formed by a variety of forming methods, including but not limited to injection molding, sheet extrusion and glazing applications. The molded articles disclosed herein may be particularly useful in a variety of applications where transparency, retention of mechanical properties, and thin-wall moldability are desired. For example, the disclosed molded articles may be used in electronic, automotive, imaging, or optical applications. Such applications may include, but are not limited to: automotive lighting lens (e.g., headlamp) applications; anti-fog windows; lenses and/or transparent covers for lighting applications such as automotive lighting, street lighting, outdoor lighting, and high efficiency lighting such as light emitting diode LED applications, organic LED applications, fluorescent lighting applications, vapor gas discharge lighting applications, and neon light applications, which may produce less heat as a byproduct compared to conventional light sources; optical lenses including camera and viewing lenses (e.g., for mobile telephone cameras and for digital still photography cameras), mirrors, telescopic lenses, binoculars, automotive camera lenses, and ophthalmic items such as eyewear including sunglasses, protective goggles, face shields, and prescription lenses. In a still further aspect, non-limiting examples of such devices in the automotive field which may use the disclosed blended thermoplastic compositions in the vehicle's interior include adaptive cruise control, headlight sensors, windshield wiper sensors, and door/window switches.

Molded articles according to aspects of the disclosure described herein may further be applicable for use in high shear molding conditions. High shear molding conditions are in some aspects similar to abusive molding conditions. High shear molding conditions may be identified by performance under particular molding conditions, including mold thickness and mold fill rate. Mold fill rate is affected by processing parameters such as gate design (small gates result in higher shear), injection speed (higher speeds result in higher shear), material viscosity, and melt temperature. Particular examples of molded articles according to aspects of the disclosure that may be formed under high shear molding conditions include, but are not limited to, sheets or extruded profiles used for glazing applications (e.g., residential glazing applications) or greenhouses.

Various combinations of elements of this disclosure are encompassed by this disclosure, e.g. combinations of elements from dependent claims that depend upon the same independent claim.

Aspects of the Disclosure

In various aspects, the present disclosure pertains to and includes at least the following aspects.

Aspect 1: A molded article comprising:
a polycarbonate resin;
an ultraviolet (UV) absorbing component;
a heat stabilizer component; and
a colorant,
wherein the molded article, when tested using a 2.5 mm color plaque, comprises a color difference delta E* (dE*) of less than about 0.6 following molding under abusive molding conditions as compared to a reference article molded under standard processing conditions.

Aspect 2: The molded article of Aspect 1, wherein the molded article comprises a color difference delta b* (db*) of less than about 0.3 after being molded under the abusive molding conditions as compared to a reference article molded under standard processing conditions.

Aspect 3: The molded article according to Aspect 1 or 2, wherein the UV absorbing component comprises a benzotriazole compound.

Aspect 4: The molded article according to Aspect 3, wherein the benzotriazole compound comprises phenol, 2,2'-methylenebis(6-(2H-benzotriazol-2-yl)-4-(1,1,3,3-tetramethylbutyl)-.

Aspect 5: The molded article according to any of the previous Aspects, wherein the molded article comprises a db* of less than about 0.1 after abusive molding at a maximum molding temperature of at least about 350° C. for a time of about 15 as compared to a reference article molded under standard processing conditions.

Aspect 6: The molded article according to any of the previous Aspects, wherein the polycarbonate resin is produced from a bisphenol A polymer having a purity of at least about 99.70%, an endcap level of at least about 98%, and which contains less than 2 ppm sulfur.

Aspect 7: The molded article according to any of the previous Aspects, wherein the molded article has a transmission higher than 89% when tested in accordance with ASTM D1003-13, Procedure A.

Aspect 8: The molded article according to any of the previous Aspects, wherein the molded article comprises from about 0.05 wt % to about 0.3 wt % UV absorbing component.

Aspect 9: The molded article according to any of the previous Aspects, wherein each of the ultraviolet (UV) absorbing component, the heat stabilizer component, and the colorant comprise no more than 20 ppm sodium, no more than 10 ppm magnesium, no more than 20 ppm calcium, no more than 0.5 ppm zinc and no more than 0.5 ppm tin.

Aspect 10: The molded article according to any of the previous Aspects, wherein the abusive molding conditions comprise a maximum molding temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

Aspect 11: The molded article according to any of the previous Aspects, wherein the molded article, when tested in accordance with ASTM D1925 (1988), comprises a change in yellowing index (ΔYI) of less than about 1.0 after abusive molding as compared to a reference article molded under standard processing conditions.

Aspect 12: The molded article according to any of the previous Aspects, wherein the polycarbonate is produced by an interfacial polymerization process and has an endcap level of at least about 95%.

Aspect 13: The molded article according to any of the previous Aspects, wherein the standard processing conditions comprise a maximum molding temperature of 300° C. at a residence time of 6 minutes.

Aspect 14: A method for forming a molded article, comprising:
    combining a polycarbonate resin, a UV absorbing component, a heat stabilizer component and a colorant to form a mixture; and
    forming a molded article from the mixture by molding the mixture under abusive molding conditions,
wherein the molded article, when tested using a 2.5 mm color plaque, comprises a color difference delta E* (dE*) of less than about 0.6 following molding under abusive molding conditions as compared to a reference article molded under standard processing conditions.

Aspect 15: The method according to Aspect 14, wherein the molded article comprises a color difference delta b* (db*) of less than about 0.3 after being molded under the abusive molding conditions as compared to a reference article molded under standard processing conditions.

Aspect 16: The method according to Aspect 14 or 15, wherein the UV absorbing component comprises a benzotriazole compound.

Aspect 17: The method according to Aspect 16, wherein the benzotriazole compound comprises phenol, 2,2'-methylenebis(6-(2H-benzotriazol-2-yl)-4-(1,1,3,3-tetramethylbutyl)-.

Aspect 18: The method according to any of Aspects 14 to 17, wherein the molded article comprises a db* of less than about 0.1 after abusive molding at a maximum molding temperature of at least about 350° C. for a time of about 15 as compared to a reference article molded under standard processing conditions.

Aspect 19: The method according to any of Aspects 14 to 18, wherein the molded article has a transmission higher than 89% when tested in accordance with ASTM D1003-13, Procedure A.

Aspect 20: The method according to any of Aspects 14 to 19, wherein the abusive molding conditions comprise a maximum molding temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

Aspect 21: A molded article comprising a polycarbonate resin and a colorant, wherein the molded article, when tested using a 3 mm color plaque, comprises a color difference delta E (dE*) of less than about 0.6 following molding under abusive molding conditions as compared to a reference article molded under standard processing conditions.

Aspect 22: The molded article of Aspect 21, wherein the molded article comprises a color difference delta b (db*) of less than about 0.3 after being molded under the abusive molding conditions.

Aspect 23: The molded article according to Aspect 21 or 22, wherein the colorant is selected from the group consisting of 1,8-Bis((4-methylphenyl) amino) anthraquinone, 1,4-Bis((2,6-diethyl-4-methylphenyl)amino)anthraquinone, 1,4-Bis(mesitylamino)anthraquinone, (29H,31H-phthalocyaninato(2-), 6,15-Dihydroanthrazine-5,9,14,18-tetrone, and combinations thereof.

Aspect 24: The molded article according to any of Aspects 21 to 23, wherein the molded article further comprises an ultraviolet (UV) absorbing component or a heat stabilizer component.

Aspect 25: The molded article according to Aspect 24, wherein:
the UV absorbing component comprises a benzotriazole, a triazine, a cyanoacrylate, a benzoxinane, or a combination thereof; and
the heat stabilizer component comprises a phenolic compound, a phosphor-based compound, or a combination thereof.

Aspect 26: The molded article according to any of Aspects 21 to 25, wherein the article comprises a shift in wavelength of maximum absorbance of less than about 5 nm after being molded under the abusive molding conditions as compared to a reference article molded under standard processing conditions.

Aspect 27: The molded article according to any of Aspects 21 to 26, wherein the article comprises a difference in absorbance intensity of less than about 15% after being molded under the abusive molding conditions as compared to a reference article molded under standard processing conditions.

Aspect 28: The molded article according to any of Aspects 21 to 27, wherein the article comprises a shift in wavelength of maximum absorbance of less than about 5 nm and a difference in absorbance intensity of less than about 15% after being molded under the abusive molding conditions as compared to a reference article molded under standard processing conditions.

Aspect 29: The molded article according to any of Aspects 21 to 28, wherein the article comprises a wavelength of maximum absorbance greater than about 550 nm after being molded under the abusive molding conditions.

Aspect 30: The molded article according to any of Aspects 21 to 29, wherein the polycarbonate resin is produced from a bisphenol A polymer having a purity of at least about 99.70%, an endcap level of at least about 98%, and which contains less than 2 ppm sulfur.

Aspect 31: The molded article according to any of Aspects 21 to 30, wherein the colorant comprises no more than 20 ppm sodium, no more than 10 ppm magnesium, no more than 20 ppm calcium, no more than 0.5 ppm zinc and no more than 0.5 ppm tin.

Aspect 32: The molded article according to any of Aspects 21 to 31, wherein the abusive molding conditions comprise a maximum molding temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

Aspect 33: The molded article according to any of Aspects 21 to 32, wherein the standard processing conditions comprise a maximum molding temperature of 300° C. at a residence time of 6 minutes.

Aspect 34: A method for forming a molded article, comprising:
combining a polycarbonate resin and a colorant to form a mixture; and
forming a molded article from the mixture by molding the mixture under abusive molding conditions, wherein the molded article, when tested using a 3 mm color plaque, comprises a color difference delta E (dE*) of less than about 0.6 following molding under abusive molding conditions as compared to a reference article molded under standard processing conditions.

Aspect 35: The method of Aspect 34, wherein the molded article comprises a color difference delta b (db*) of less than about 0.3 after being molded under the abusive molding conditions.

Aspect 36: The method according to Aspect 34 or 35, wherein the colorant is selected from the group consisting of 1,8-Bis((4-methylphenyl) amino) anthraquinone, 1,4-Bis((2,6-diethyl-4-methylphenyl)amino)anthraquinone, 1,4-Bis(mesitylamino)anthraquinone, (29H,31H-phthalocyaninato (2-), 6,15-Dihydroanthrazine-5,9,14,18-tetrone, and combinations thereof.

Aspect 37: The method according to any of Aspects 34 to 36, wherein the article comprises a shift in wavelength of maximum absorbance of less than about 5 nm after being molded under the abusive molding conditions as compared to a reference article molded under standard processing conditions.

Aspect 38: The method according to any of Aspects 34 to 37, wherein the article comprises a difference in absorbance intensity of less than about 15% after being molded under the abusive molding conditions as compared to a reference article molded under standard processing conditions.

Aspect 39: The method according to any of Aspects 34 to 38, wherein the article comprises a wavelength of maximum absorbance greater than about 550 nm after being molded under the abusive molding conditions.

Aspect 40: The method according to any of Aspects 34 to 39, wherein the abusive molding conditions comprise a maximum molding temperature of at least about 330° C. at a residence time of at least about 10 minutes, or a maximum molding temperature of at least about 340° C. at a residence time of at least about 6 minutes, or a maximum molding temperature of at least about 350° C. at a residence time of at least about 6 minutes, or a maximum molding temperature of at least about 360° C. at a residence time of at least about 3 minutes.

Aspect 41: The molded article according to any of the previous Aspects, wherein the molded article is formed under high shear molding conditions.

Aspect 42: The molded article according to any of the previous Aspects, wherein the molded article is formed under high shear molding conditions and is a sheet or extruded profile used for glazing applications or greenhouses.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The components and additives presented in Table 1 were used to prepare molded articles according to aspects of the present disclosure and comparative articles to be used for comparison to molded articles according to aspects of the disclosure.

TABLE 1

Components and additives

| Component | Chemical description | Source |
|---|---|---|
| PC1 | Linear Bisphenol A Polycarbonate, produced via interfacial polymerization, Mw of about 30,000 grams per mole (g/mol) as determined by GPC using polycarbonate standards, phenol end-capped (at least 99%) | SABIC |
| PC2 | Linear Bisphenol A Polycarbonate, produced via interfacial polymerization, Mw of about 21,800 g/mol as determined by GPC using polycarbonate standards, para-cumylphenyl (PCP) end-capped (at least 99%) | SABIC |
| IRGAFOS 168 | Tris(di-t-butylphenyl)phosphite | |
| Irganox 1076 | Octadecyl 3(3,5ditertbutyl4hydroxy-phenyl)propionate | |
| PETS | Palmitic/Stearic Acid Ester of Dipenta/Pentaerythritol | |
| UV5411 | 2-(2'-Hydroxy-5'-t-octylphenyl) benzotriazole | |
| UVA 234 | 2-(2 hydroxy-3,5 dicumyl) benzotriazole | |
| LA31RG/T360 | phenol, 2,2'-methylenebis(6-(2H-benzotriazol-2-yl)-4-(1,1,3,3-tetramethylbutyl)- | |
| UV3030 | 1,3-Bis((2-cyano-3,3-diphenylacryloyl)oxy)-2,2-bis(((2-cyano-3,3-diphenylacryloyl)oxy)methyl)propane | |
| UV3638 | 2,2(p-phenylen)di-3,1benzoxazine | |

Additives listed in Table 1 had the purities listed in Table 2. The additive purities were determined using elemental analysis.

TABLE 2

Additive purity based on elemental analysis

| Impurity | UV5411 | Tin360 | PETS | Irgaphos 168 | Irganox 1076 |
|---|---|---|---|---|---|
| Sodium, Na | <1 | <1 | <1 | <1 | 19.1 |
| Magnesium, Mg | 0.7 | 0.2 | 0.4 | <1 | <1 |
| Calcium, Ca | 8.2 | <2 | 3.1 | <2 | <2 |
| Zinc, Zn | 0.5 | 0.5 | <0.1 | nd | nd |
| Tin, Sn | <0.05 | <0.05 | 0.5 | nd | nd |

Polycarbonate samples were prepared using the components and additives as presented in Table 1. Resultant polycarbonate samples were dried at 120° C. for 2-3 hours prior to injection molding. Sample plaques of 2.5 millimeter (mm) thickness were then prepared using an injection molding machine (Engel-75, dedicated to transparent polycarbonate). As a reference for standard molding conditions, the following temperature profile was used: zone 1/zone 2/zone 3/nozzle=280° C./290° C./300° C./295° C. The residence time of the material in the screw was controlled by the cooling time. These processing conditions may be indicated by the following denotation: T(melt)/residence time=300° C. per 6 minutes (6'). Similarly, abusive molding may be performed at higher temperatures, but with the same temperature profile as for the referenced standard molding conditions above.

Yellowness Index (YI) values were calculated according to ASTM D1925 (1988). Colorimetric values (L*, a*, b* and YI) were calculated from the measured transmission spectra of a 2.5 mm thick color plaque (length and width dimensions of 600 mm each) between 400 nanometers (nm) and 700 nm. Spectroscopic data was measured on a Macbeth 7000A device in transmission mode and UV included.

Examples 1 through 3 (Ex1-Ex3) were assessed to determine the effect of using a given benzotriazole UV absorbing component over another during processing conditions with elevated temperature and increased residence times. Ex1 has no benzotriazole UV absorbing component; Ex2 includes UV5411; and Ex3 includes LA31RG. Each sample was evaluated as above for the $\Delta$YI for 300° C. to 350° C. Results are provided in Table 3.

TABLE 3

Effect of different benzotriazole UV absorbing components on $\Delta$YI

| Component | Unit | Ex1 | Ex2 | Ex3 |
|---|---|---|---|---|
| PC1 | wt % | 17.3 | 17.3 | 17.3 |
| PC2 | wt % | 82.45 | 82.3 | 82.3 |
| Irgafos 168 | wt % | 0.08 | 0.08 | 0.08 |
| Irganox 1076 | wt % | 0.02 | 0.02 | 0.02 |
| PETS | wt % | 0.3 | 0.3 | 0.3 |
| UV absorbing component | type | none | UV5411 | LA31RG |
| | wt % | | 0.15 | 0.15 |
| YI (300° C./6') | D1925 | 1.19 | 1.46 | 1.76 |
| YI (350° C./6') | D1925 | 1.43 | 1.55 | 1.88 |
| YI (350° C./15') | D1925 | 1.62 | 2.13 | 2.07 |
| $\Delta$YI (350° C./15' vs 300° C./6') | D1925 | 0.43 | 0.66 | 0.30 |
| dE* (350° C./15' vs 300° C./6') | | | 0.27 | 0.35 | 0.13 |
| db* (350° C./15' vs 300° C./6') | | | 0.28 | 0.35 | 0.04 |

For each sample Ex1-Ex3, $\Delta$YI increased with an increase in the processing temperature as well as with an increase in the residence time. In the absence of a UV absorbing component (Ex1), the $\Delta$YI exhibited a shift of 0.43. The shift for Ex2 including UV5411 was comparable at a shift value of 0.66. The LA31RG UV absorbing component (Ex3), however, exhibited a significantly smaller shift of 0.30. Further, and surprisingly, the db* for Ex3 is significantly lower, approximately three times smaller than both Ex1 and Ex2.

Additional examples were also evaluated across a selection of UV absorbing components from varying classes to assess the effect of the UV absorbing component on $\Delta$YI. Tables 4A and 4B provide the $\Delta$YI observed for molded polycarbonate articles having varying UV absorbing components, the molded article made using different molding conditions: 350° C., 15 minute residence time (abusive molding conditions) and 300° C., 6 minute residence time (standard molding conditions). Sample color was evaluated before abusive molding processing. $\Delta$YI was calculated according to ASTMD1925 (1988).

TABLE 4A

Formulations for polycarbonate compositions with UV absorbing components

| Component | Unit | Ex4 | Ex5 | Ex6 | Ex7 | Ex8 | Ex9 |
|---|---|---|---|---|---|---|---|
| PC1 | wt % | 17.3 | 17.3 | 17.3 | 17.3 | 17.3 | 17.3 |
| PC2 | wt % | 82.3 | 82.1 | 82.3 | 82.3 | 82.3 | 82.3 |
| Irganox 1076 | wt % | 0.02 | 0.02 | 0.02 | 0.02 | 0.02 | 0.02 |
| Irgafos 168 | wt % | 0.08 | 0.08 | 0.08 | 0.08 | 0.08 | 0.08 |
| UV5411 | wt % | 0.15 | 0.00 | 0.00 | 0.00 | 0.00 | 0.00 |
| LA31RG | wt % | 0.00 | 0.15 | 0.00 | 0.00 | 0.00 | 0.00 |
| T234 | wt % | 0.00 | 0.00 | 0.15 | 0.00 | 0.00 | 0.00 |
| UV3030 | wt % | 0.00 | 0.00 | 0.00 | 0.15 | 0.00 | 0.00 |
| 3638 | wt % | 0.00 | 0.00 | 0.00 | 0.00 | 0.15 | 0.00 |
| T1577 | wt % | 0.00 | 0.00 | 0.00 | 0.00 | 0.00 | 0.15 |

TABLE 4B

Selection of UV absorbing components for transparent polycarbonate for high heat processing

| Example | Ex4 | Ex5 | Ex6 | Ex7 | Ex8 | Ex9 |
|---|---|---|---|---|---|---|
| UV Component | UV5411/ T329 | LA31RG/ T360 | T234 | UV3030 | 3638 | T1577 |
| UV absorbing component class | benzo-triazole | benzo-triazole | benzo-triazole | Cyano-acrylate | benzox-axinone | triazine |
| Initial color (standard molding) | + | 0 | 0 | + | ++ | − |
| YI (ASTM D1925, 2.5 mm, standard molding) | 1.7 | 1.9 | 1.9 | 1.7 | 1.6 | 2.3 |
| $T_{onset}$ dec/evap (° C.) | 239 | 408 | 324 | 390 | 361 | − |
| Color change upon abusive molding | + | + | + | −− | 0 | − |
| ΔYI (ASTMD1925, 2.5 mm) (350° C./15' vs 300° C./6')[1] | 0.66 | 0.30 | − | 3.69 | − | 0.94 |
| ΔYI (ASTMD1925, 2.5 mm) (320° C./6' vs 360° C./6')[1] | 0.3 | 0.2 | 0.4 | 3.6 | 0.6 | − |
| % T (ASTM D1003, Procedure A, 2.5 mm plaque) | 91.0 | 91.0 | 91.0 | 91.0 | 91.0 | 90.9 |
| UV performance | + | 0 | 0 | − | − | + |
| ΔYI weathering (1000 hrs ISO 11341 vs 0 hrs, ASTMD1925, 2.5 mm plaque, standard molding) | 2.1 | 2.6 | 2.8 | 3.1 | 3.1 | 1.6 |

[1]Reference formulations contained 0.30 wt % of UV absorbing component

Qualitative assessments for initial color (standard molding) and the color change following abusive molding are shown. Thermal stability (temperature at onset of decomposition or evaporation, $T_{onset}$ dec/evap) was determined by thermal gravimetric analysis. Transmittance (% T) was tested in accordance with ASTM D1003, Procedure A, using a 2.5 mm color plaque. The data illustrates that thermal stability cannot necessarily be used to determine whether a UV absorbing component will provide good color properties to a molded article upon abusive molding. For example, the UV absorbing component in Ex7 (UV 3030, a cyanoacrylate compound) has thermal stability properties that are comparable to one or more benzotriazole compounds (see LA31RG in Ex5) but exhibits poor ΔYI properties upon abusive molding. In some aspects benzotriazole compounds may be preferred over the other UV absorbing compounds based on their combination of low initial YI, low ΔYI following abusive molding, and weathering performance.

As shown, the selected UV absorbing components may improve the color stability, or minimize the shift in the Yellowness Index (YI), for compositions processed at elevated temperatures at which a greater shift may typically occur. Ex7 (which included the UV3030 absorber) exhibited the greatest ΔYI. Of the various UV absorbing components tested, UV3030 has the highest decomposition temperature. The other examples exhibited a significantly lower ΔYI. Each example Ex4-Ex6 included a UV absorbing component of the category of benzotriazoles which are known in the art for reactivity with polycarbonate. Thus, it was surprising that Ex7 having the UV absorbing component with a comparable decomposition temperature would exhibit the greatest ΔYI, while the examples Ex4-Ex6 having the more reactive UV absorbing components exhibited the lowest color shift (ΔYI).

Colorants were also evaluated for the effect on stability of several polycarbonate composition formulations. Polycarbonate samples were prepared using the components and additives from Table 1 as well as colorants COL1 through COLT as presented in Table 5.

TABLE 5

Colorants

| | Colorant Name | Chemical Name | Source | CAS Number |
|---|---|---|---|---|
| COL 1 | Solvent Violet 13 | 1-hydroxy-4-(p-tolylamino)anthracene-9,10-dione | Farbtex Int LTD | 81-48-1 |
| COL 2 | Solvent Violet 36 | 1,8-Bis((4-methylphenyl) amino) anthraquinone | Farbtex Int LTD, Lanxess | 82-16-6 |
| COL 3 | Solvent Blue 97 | 1,4-Bis((2,6-diethyl-4-methylphenyl)amino)anthraquinone | Lanxess, Farbtex Int LTD | 32724-62-2 |
| COL 4 | Solvent Blue 104 | 1,4-Bis(mesitylamino)anthraquinone | Clariant, Farbtex Int LTD | 116-75-6 |
| COL 5 | Pigment Blue 15:1 | (29H,31H-phthalocyaninato(2-) | BASF | 147-14-8 |
| COL 6 | Pigment Blue 60 | 6,15-Dihydroanthrazine-5,9,14,18-tetrone | CIBA | 81-77-6 |
| COL 7 | Disperse Violet 26/31 | 1,4-diamino-2,3-diphenoxyanthraquinone | Farbtex Int LTD | 6408-72-6 |

Resultant polycarbonate samples were dried at 120° C. for 2-3 hours prior to injection molding Sample plaques of 3 millimeter (mm) thickness were then prepared using an injection molding machine (Engel-75, dedicated to transparent polycarbonate). As a reference for standard molding conditions, the following temperature profile was used: zone 1/zone 2/zone 3/nozzle at 280° C./290° C./300° C./295° C. The residence time of the material in the screw was controlled by the cooling time. For abusive conditioning, the temperature profile was increased: zone1/zone2/zone3/nozzle at 300° C./320° C./350° C./340° C. As a guide, standard conditions had a Temperature(melt)/residence time of 310° C./6 min while the most severe processing conditions were 350° C./15 min.

Colorants for evaluation were selected that absorb light in the wavelength range opposing that of the wavelength absorbed by the UV absorbing component. Transmission spectra were obtained for polycarbonate compositions comprising a colorant COL1-COL7. Compensation of yellowing in the polycarbonate is based on making use of the opponent color theory which provides that blue color opposes yellow color. Accordingly, absorption in the short wavelength region of the visible spectrum giving the polycarbonate a yellow appearance should be compensated by absorption of colorants in the mid-to-long wavelengths of the visible spectrum. Formulations for the polycarbonate compositions including additives and colorants are provided in Table 6 and are denoted Examples 10 through 16 (Ex10-Ex16).

TABLE 6

Formulations for polycarbonate compositions with additive and colorants

| Component | Unit | Ex10 | Ex11 | Ex12 | Ex13 | Ex14 | Ex15 | Ex16 |
|---|---|---|---|---|---|---|---|---|
| PC1 | wt % | 17.3 | 17.3 | 17.3 | 17.3 | 17.3 | 17.3 | 17.3 |
| PC2 | wt % | 82.1 | 82.3 | 82.3 | 82.3 | 82.3 | 82.3 | 82.3 |
| Irganox 1076 | wt % | 0.02 | 0.02 | 0.02 | 0.02 | 0.02 | 0.02 | 0.02 |
| Irgafos 168 | wt % | 0.08 | 0.08 | 0.08 | 0.08 | 0.08 | 0.08 | 0.08 |
| COL1 | wt % | 0.0005 | 0.00 | 0.00 | 0.00 | 0.00 | 0.00 | 0.00 |
| COL2 | wt % | 0.00 | 0.0005 | 0.00 | 0.00 | 0.00 | 0.00 | 0.00 |
| COL3 | wt % | 0.00 | 0.00 | 0.0005 | 0.00 | 0.00 | 0.00 | 0.00 |
| COL4 | wt % | 0.00 | 0.00 | 0.00 | 0.0005 | 0.00 | 0.00 | 0.00 |
| COL5 | wt % | 0.00 | 0.00 | 0.00 | 0.00 | 0.0001 | 0.00 | 0.00 |
| COL6 | wt % | 0.00 | 0.00 | 0.00 | 0.00 | 0.00 | 0.00025 | 0.00 |
| COL7 | wt % | 0.00 | 0.00 | 0.00 | 0.00 | 0.00 | 0.00 | 0.0005 |

Transmission spectra for Ex10-Ex16 were measured on an X-Rite i7 spectrophotometer for standard and abusive molding conditions using a 3 mm color plaque. Absorbance was calculated from the transmission spectra using the Beer-Lambert law, $A_\lambda = \log_{10}(I_0/I) = a\lambda \cdot b \cdot c$, discussed above. Table 7 presents the maximum absorption wavelength data for the polycarbonate examples having the varied colorants and prepared under standard processing conditions and abusive molding conditions. Data for absorbance change and dE* is provided. Unstable colorants show a shift in the absorption maximum (shift ($\Delta\lambda$)) and/or decreased absorbance. Ex15, which included COL6 (P BL 60) did not exhibit a clear maximum in its absorption spectrum, accordingly a shift in wavelength was not observed.

TABLE 7

Maximum absorption wavelength of colorants under standard and abusive molding conditions

| | | Wavelength of maximum absorbance in PC | | | | Absorbance change at maxima | | |
|---|---|---|---|---|---|---|---|---|
| | | Standard | | Abusive | | ΔI | | |
| | | Peak 1 | Peak 2 | Peak 1 | Peak 2 | | | |
| Ex No. | Colorant | (nm) | (nm) | (nm) | (nm) | Δλ | Peak 1 | Peak 2 | dE* |
| Ex10 | COL1 | 580 | — | 530 | — | 50 | 53% | — | 4.38 |
| Ex11 | COL2 | 560 | — | 560 | — | 0 | −2% | — | 0.27 |
| Ex12 | COL3 | 590 | 630 | 590 | 630 | 0 | 2% | 3 | 0.37 |
| Ex13 | COL4 | 590 | 630 | 590 | 630 | 0 | 5% | 5% | 0.58 |
| Ex14 | COL5 | 670 | — | 670 | — | 0 | 2% | — | 0.37 |
| Ex15 | COL6 | — | — | — | — | — | — | — | 0.43 |
| Ex16 | COL7 | 540 | 570 | 540 | 570 | 0 | 26% | 30% | 1.65 |

*COL6 does not show a specific absorption peak
For all data: standard molding conditions are 300° C./6 min; abusive are 350° C./15 min
Absorbance change-Shift (Δλ wavelength) determined from comparison of standard to abusive
Absorbance change-Shift (ΔI intensity) determined from comparison of standard to abusive
dE*difference determined from comparison of standard to abusive As shown in Table 7, Ex10 (COL1) shows a significant shift in the absorption maximum. As a reference, Table 8 lists the thermal stability of the evaluated colorants in polycarbonate resin compositions. COL1 has the highest thermal stability at 350° C., while also exhibiting the greatest shift in wavelength for the maximum absorption wavelengths. A larger shift indicated molecular degradation. Surprisingly, it appears that the most thermally stable colorant resulted in a polycarbonate composition with the greatest degradation when abusively molded. In contrast, COL5, which has a maximum stability up to 300° C. in polycarbonate, does not show either a shift in absorption maximum or a decrease in absorption intensity. It is noted, however, that thermal stability data for colorants in a polymer matrix or resin composition may vary with the grade formulation and depend upon specific temperatures, such as the testing temperature, which can initiate or inhibit polymer and/or additive reactions.

TABLE 8

Thermal stability of colorants in polycarbonate

| Colorant | Temperature (° C.) |
|---|---|
| COL1 | 350 |
| COL2 | 350 |
| COL3 | 340 |
| COL4 | 340 |
| COL5 | 300 |
| COL6 | 300 |
| COL7 | 300 |

*Thermal stability data tested in accordance with DIN EN 12877 (provided by supplier)

Samples containing various combinations of UV absorbing components and colorants were also evaluated based upon the change in color (dE* and db*) and for several samples the change in absorbance (ΔI). Results are provided in Table 9. The data demonstrates that the absorbance change of the selected colorants is less than 15%. Further, no shift in wavelength of maximum absorbance was observed. The db* for Ex21-Ex24 containing LA31RG are also significantly lower than for Ex17-Ex20, showing a significantly higher color stability of the one benzotriazole UV absorbing component over the other.

TABLE 9

Formulations for polycarbonate compositions with additive and colorants

| Component | Unit | Ex17 | Ex18 | Ex19 | Ex20 | Ex21 | Ex22 | Ex23 | Ex24 |
|---|---|---|---|---|---|---|---|---|---|
| PC1 | wt.% | 17.3 | 17.3 | 17.3 | 17.3 | 17.3 | 17.3 | 17.3 | 17.3 |
| PC2 | wt.% | 82.3 | 82.1 | 82.3 | 82.3 | 82.3 | 82.3 | 82.3 | 82.3 |
| Irganox 1076 | wt.% | 0.02 | 0.02 | 0.02 | 0.02 | 0.02 | 0.02 | 0.02 | 0.02 |
| Irgafos 168 | wt.% | 0.08 | 0.08 | 0.08 | 0.08 | 0.08 | 0.08 | 0.08 | 0.08 |
| UV5411 | wt % | 0.20 | 0.20 | 0.20 | 0.20 | 0.00 | 0.00 | 0.00 | 0.00 |
| LA31RG | wt.% | 0.00 | 0.00 | 0.00 | 0.00 | 0.15 | 0.15 | 0.15 | 0.15 |
| COL2 | wt.% | 1.0 E-4 | 0.00 | 0.00 | 0.00 | 1.0 E-4 | 0.00 | 0.00 | 0.00 |
| COL3 | wt.% | 0.00 | 1.0 E-4 | 0.00 | 0.00 | 0.00 | 1.0 E-4 | 0.00 | 0.00 |
| COL4 | wt.% | 0.00 | 0.00 | 1.0 E-4 | 0.00 | 0.00 | 0.00 | 1.0 E-4 | 0.00 |
| COL5 | wt.% | 0.00 | 0.00 | 0.00 | 2.0 E-5 | 0.00 | 0.00 | 0.00 | 2.0 E-5 |
| dE* | | 0.31 | 0.27 | 0.22 | 0.19 | 0.18 | 0.20 | 0.18 | 0.18 |
| db* | | 0.30 | 0.26 | 0.20 | 0.18 | 0.01 | 0.02 | 0.04 | −0.02 |
| ΔI | | 10.5 | 7.2/10.6 | −0.2/−4.9 | 1.7 | 9.3 | 5.7/5.9 | 0.5/−2.3 | 3.1 | dE*, db* and ΔT determined by comparison of standard (300° C./6 min) to abusive (350° C./15 min) molding conditions.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The which is claimed is:

1. A molded article comprising:
   a polycarbonate resin, and
   0.00001 to 0.01 wt % of a colorant based on the total weight of the molded article,
   wherein the molded article, when tested using a 3 mm color plaque, comprises a color difference delta E (dE*) of less than or equal to 0.6 following molding under abusive molding conditions as compared to a reference article molded under standard processing conditions;
   wherein the abusive molding conditions comprise a maximum molding temperature of 330° C. to less than 340° C. at a residence time of at least 10 minutes, or a maximum molding temperature of 340° C. to less than 360° C. -at a residence time of at least 6 minutes, or a maximum molding temperature of at least 360° C. at a residence time of at least 3 minutes;
   wherein the standard processing conditions comprise a maximum molding temperature of 300° C. at a residence time of 6 minutes.

2. The molded article of claim 1, wherein the molded article comprises a color difference delta b (db*) of less than 0.3 after being molded under the abusive molding conditions.

3. The molded article according to claim 1, wherein the colorant is selected from the group consisting of 1,8-Bis((4-methylphenyl) amino) anthraquinone, 1,4-Bis((2,6-diethyl-4-methylphenyl)amino)anthraquinone, 1,4-Bis(mesitylamino)anthraquinone, (29H,31H-phthalocyaninato(2-), 6,15-Dihydroanthrazine-5,9,14,18-tetrone, and combinations thereof.

4. The molded article according to claim 1, wherein the molded article further comprises an ultraviolet (UV) absorbing component or a heat stabilizer component.

5. The molded article according to claim 4, wherein:
   the UV absorbing component comprises a benzotriazole, a triazine, a cyanoacrylate, a benzoxinane, or a combination thereof; and
   the heat stabilizer component comprises a phenolic compound, a phosphor-based compound, or a combination thereof.

6. The molded article according to claim 1, wherein the article comprises a shift in wavelength of maximum absorbance of less than 5 nm after being molded under the abusive molding conditions as compared to a reference article molded under standard processing conditions.

7. The molded article according to claim 1, wherein the article comprises a difference in absorbance intensity of less than 15% after being molded under the abusive molding conditions as compared to a reference article molded under standard processing conditions.

8. The molded article according to claim 1, wherein the article comprises a shift in wavelength of maximum absorbance of less than 5 nm and a difference in absorbance intensity of less than 15% after being molded under the abusive molding conditions as compared to a reference article molded under standard processing conditions.

9. The molded article according to claim 1, wherein the article comprises a wavelength of maximum absorbance greater than 550 nm after being molded under the abusive molding conditions.

10. The molded article according to claim 1, wherein the polycarbonate resin is produced from a bisphenol A polymer having a purity of at least 99.70%, an endcap level of at least 98%, and which contains less than 2 ppm sulfur.

11. The molded article according to claim 1, wherein the colorant comprises no more than 20 ppm sodium, no more than 10 ppm magnesium, no more than 20 ppm calcium, no more than 0.5 ppm zinc and no more than 0.5 ppm tin.

12. A method for forming a molded article, comprising:
    combining a polycarbonate resin and a colorant to form a mixture; and
    forming a molded article from the mixture by molding the mixture under abusive molding conditions,
    wherein the molded article, when tested using a 3 mm color plaque, comprises a color difference delta E (dE*) of less than 0.6 following molding under abusive molding conditions as compared to a reference article molded under standard processing conditions;
    wherein the abusive molding conditions comprise a maximum molding temperature of at 330° C. to less than 340° C. at a residence time of at least 10 minutes, or a maximum molding temperature of at least about 340° C. to less than 360° C. at a residence time of at least 6 minutes, or a maximum molding temperature of at least 360° C. at a residence time of at least 3 minutes;
    wherein the standard processing conditions comprise a maximum molding temperature of 300° C. at a residence time of 6 minutes.

13. The method of claim 12, wherein the molded article comprises a color difference delta b (db*) of less than 0.3 after being molded under the abusive molding conditions.

14. The method according to claim 12, wherein the colorant is selected from the group consisting of 1,8-Bis((4-methylphenyl) amino) anthraquinone, 1,4-Bis ((2,6-diethyl-4-methylphenyl)amino)anthraquinone, 1,4-Bis(mesitylamino)anthraquinone, (29H,31H-phthalocyaninato(2-), 6,15-Dihydroanthrazine-5,9,14,18-tetrone, and combinations thereof.

15. The method according to claim 12, wherein the article comprises a shift in wavelength of maximum absorbance of less than 5 nm after being molded under the abusive molding conditions as compared to a reference article molded under standard processing conditions.

16. The method according to claim 12, wherein the article comprises a difference in absorbance intensity of less than 15% after being molded under the abusive molding conditions as compared to a reference article molded under standard processing conditions.

17. The method according to claim 12, wherein the article comprises a wavelength of maximum absorbance greater than 550 nm after being molded under the abusive molding conditions.

18. A molded article comprising:
   a bisphenol A polymer;
   00001 to 0.01 wt% of a colorant comprising 1,8-Bis((4-methylphenyl) amino) anthraquinone, 1,4-Bis((2,6-diethyl-4-methylphenyl)amino)anthraquinone, 1,4-Bis (mesitylamino)anthraquinone, (29H,31H-phthalocyaninato(2-), 6,15-Dihydroanthrazine-5,9,14,18-tetrone, or a combination thereof;
   a UV absorbing component comprising a benzotriazole, a triazine, a cyanoacrylate, a benzoxinane, or a combination thereof; and
   a heat stabilizer component comprising a phenolic compound, a phosphor-based compound, or a combination thereof;
   wherein the molded article, when tested using a 3 mm color plaque, comprises a color difference delta E (dE*) of less than 0.6 following molding under abusive molding conditions as compared to a reference article molded under standard processing conditions;
   wherein the abusive molding conditions comprise a maximum molding temperature of at 330° C. to less than 340° C. at a residence time of at least 10 minutes, or a maximum molding temperature of 340° C. to less than 360° C. at a residence time of at least 6 minutes, or a maximum molding temperature of at least 360° C. at a residence time of at least 3 minutes;
   wherein the standard processing conditions comprise a maximum molding temperature of 300° C. at a residence time of 6 minutes.

19. The molded article of claim 18, comprising:
   0.01 to 1 w % of the UV absorbing component; and
   0.01 to 0.5 wt % of the heat stabilizer component;
   wherein the amounts are based on the total weight of the molded article.

20. The method of claim 12, wherein the mixture comprises 0.00001 to 0.01 wt % of the colorant based on the total weight of the molded article.

* * * * *